(12) United States Patent
Jung et al.

(10) Patent No.: US 12,392,005 B2
(45) Date of Patent: Aug. 19, 2025

(54) FERRITIC STAINLESS STEEL WITH IMPROVED HIGH TEMPERATURE CREEP RESISTANCE AND MANUFACTURING METHOD THEREFOR

(71) Applicant: POSCO, Pohang-si (KR)

(72) Inventors: Il Chan Jung, Pohang-si (KR); Hoi Hun Kim, Pohang-si (KR); Han Jin Ryu, Pohang-si (KR)

(73) Assignee: POSCO, Pohang-si (KR)

( * ) Notice: Subject to any disclaimer, the term of this patent is extended or adjusted under 35 U.S.C. 154(b) by 734 days.

(21) Appl. No.: 17/632,926

(22) PCT Filed: Feb. 6, 2020

(86) PCT No.: PCT/KR2020/001718
§ 371 (c)(1),
(2) Date: Feb. 4, 2022

(87) PCT Pub. No.: WO2021/025248
PCT Pub. Date: Feb. 11, 2021

(65) Prior Publication Data
US 2022/0356542 A1      Nov. 10, 2022

(30) Foreign Application Priority Data
Aug. 5, 2019   (KR) .................. 10-2019-0095077

(51) Int. Cl.
*C21D 9/46* (2006.01)
*C21D 6/00* (2006.01)
(Continued)

(52) U.S. Cl.
CPC .............. *C21D 9/46* (2013.01); *C21D 6/002* (2013.01); *C21D 6/005* (2013.01); *C21D 6/008* (2013.01);
(Continued)

(58) Field of Classification Search
CPC ...................................................... C21D 9/46
See application file for complete search history.

(56) References Cited

U.S. PATENT DOCUMENTS

| | | |
|---|---|---|
| 5,462,611 A | 10/1995 | Uematsu et al. |
| 2010/0122800 A1 | 5/2010 | Nishida et al. |

(Continued)

FOREIGN PATENT DOCUMENTS

| | | |
|---|---|---|
| CN | 1524130 A | 8/2004 |
| CN | 105431562 A | 3/2016 |

(Continued)

OTHER PUBLICATIONS

Machine translation of JP H03-264652 A (Japanese language document published Nov. 1991).*

(Continued)

*Primary Examiner* — Christopher S Kessler
(74) *Attorney, Agent, or Firm* — Morgan Lewis & Bockius LLP

(57) ABSTRACT

Disclosed is a ferritic stainless steel with improved high temperature creep resistance. The disclosed ferritic stainless steel comprises by weight %: 0.005 to 0.03% of C, 0.005 to 0.03% of N, 0.05 to 0.9% of Si, 0.05 to 0.9% of Mn, 14.0 to 19.0% of Cr, 0.1 to 0.6% of Ti, 0.1 to 0.6% of Nb, 0.1 to 0.6% of Cu, 0.01 to 0.04% of P, 0.01% or less (excluding 0) of S, and the balance of iron (Fe) and inevitable impurities, and is characterized by satisfying Expressions (1) and (2) below.

$0.5 \leq Nb/Cu \leq 3$          Expression (1)

$20 \leq [2Nb+Ti]/[C+N]$          Expression (2)

wherein Nb, Cu, Ti, C, and N denote contents (wt %) of each element.

9 Claims, 1 Drawing Sheet

(51) Int. Cl.
  *C21D 8/02*   (2006.01)
  *C22C 38/00*  (2006.01)
  *C22C 38/02*  (2006.01)
  *C22C 38/04*  (2006.01)
  *C22C 38/20*  (2006.01)
  *C22C 38/26*  (2006.01)
  *C22C 38/28*  (2006.01)

(52) U.S. Cl.
  CPC ......... *C21D 8/0205* (2013.01); *C21D 8/0236* (2013.01); *C22C 38/001* (2013.01); *C22C 38/002* (2013.01); *C22C 38/02* (2013.01); *C22C 38/04* (2013.01); *C22C 38/20* (2013.01); *C22C 38/26* (2013.01); *C22C 38/28* (2013.01); *C21D 2211/004* (2013.01); *C21D 2211/005* (2013.01)

(56) References Cited

U.S. PATENT DOCUMENTS

| | | | |
|---|---|---|---|
| 2013/0139493 | A1 | 6/2013 | Imakawa et al. |
| 2016/0115562 | A1 | 4/2016 | Santacreu et al. |

FOREIGN PATENT DOCUMENTS

| | | |
|---|---|---|
| CN | 107002189 A | 8/2017 |
| EP | 1818422 A1 | 8/2007 |
| JP | H03-264652 A | 11/1991 |
| JP | H08-260107 A | 10/1996 |
| JP | H10-008218 A | 1/1998 |
| JP | H10-204590 A | 8/1998 |
| JP | 2005-089850 A | 4/2005 |
| JP | 2008-001945 A | 1/2008 |
| JP | 2011-526654 A | 10/2011 |
| JP | 2014-214348 A | 11/2014 |
| JP | 2019-002053 A | 1/2019 |
| KR | 10-2001-0108675 A | 12/2001 |
| KR | 10-0799240 B1 | 1/2008 |
| KR | 10-2012-0099152 A | 9/2012 |
| WO | 2017/073093 A1 | 5/2017 |

OTHER PUBLICATIONS

Indian Office Action dated Apr. 28, 2022 issued in Indian Patent Application No. 202217006426 (with English translation).
Chinese Office Action dated Jul. 20, 2022 issued in Chinese Patent Application No. 202080059787.2 (with English translation).
Extended European Search Report dated Sep. 6, 2022 issued in European Patent Application No. 20850717.8.
Japanese Office Action dated Mar. 14, 2023 issued in Japanese Patent Application No. 2022-507549 (with English translation).
Japanese Office Action dated Oct. 5, 2023 issued in Japanese Patent Application No. 2022-507549 (with English translation).
International Search Report dated Nov. 11, 2020 issued in International Patent Application No. PCT/KR2020/001718 (with English translation).
Korean Notice of Allowance dated Mar. 19, 2021 issued in Korean Patent Application No. 10-2019-0095077.
Korean Office Action dated Nov. 2, 2020 issued in Korean Patent Application No. 10-2019-0095077.

* cited by examiner

[FIG.1]
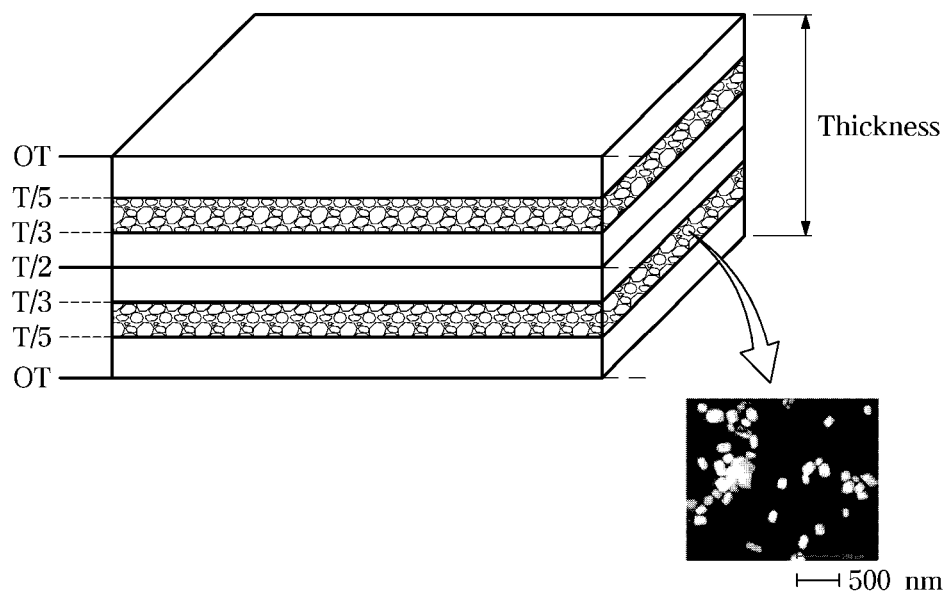
[FIG.2]
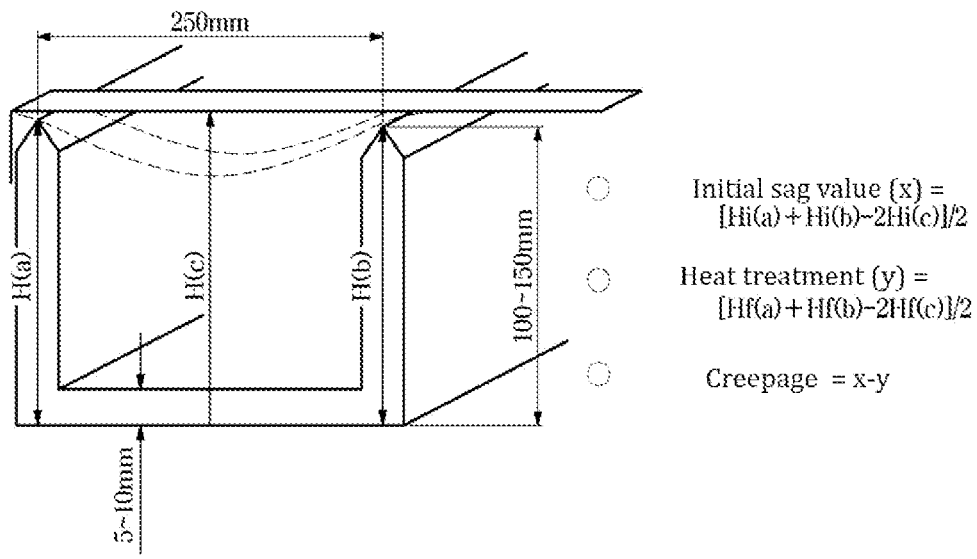

FERRITIC STAINLESS STEEL WITH IMPROVED HIGH TEMPERATURE CREEP RESISTANCE AND MANUFACTURING METHOD THEREFOR

CROSS-REFERENCE OF RELATED APPLICATIONS

This application is the U.S. National Phase under 35 U.S.C. § 371 of International Patent Application No. PCT/KR2020/001718, filed on Feb. 6, 2020, which in turn claims the benefit of Korean Application No. 10-2019-0095077, filed on Aug. 5, 2019, the entire disclosures of which applications are incorporated by reference herein.

TECHNICAL FIELD

The present disclosure relates to a ferritic stainless steel, and more particularly, to a ferritic stainless steel with improved high temperature creep resistance and a manufacturing method therefor.

BACKGROUND ART

In general, stainless steels are classified according to chemical components or a metal structure thereof. Depending on the metal structure, stainless steels may be classified into austenitic, ferritic, martensitic, and dual phase stainless steels.

Ferritic stainless steels are superior in corrosion resistance while including a small amount of expensive alloying elements, thereby having higher price competitiveness than that of austenitic stainless steels. Particularly, high-Cr-content ferritic stainless steels including 14 to 19% of chromium (Cr) have been used for materials of exhaust systems of vehicles withstanding a temperature range of flue gas from room temperature to 900° C. (e.g., muffler, ex-manifold, collector cone, and selective catalyst reduction (SCR).

Materials used in a high-temperature environment to which a constant load is applied should have excellent creep resistance as well as heat resistance. Creep refers to a time-dependent deformation occurring in a material in a high-temperature environment under a constant stress, and creep deformation is known to be affected by temperature, time, grain size, and stress. Therefore, when deformation is caused by creep with high-temperature corrosion in a high-temperature environment, a material cannot withstand a stress or may cause numerical changes, thereby losing original functions thereof.

Creep resistance generally depends on precipitate formation and grain size. In the case where creep resistance is controlled by using formation of precipitates, creep resistance is improved by the precipitates but the size of grains decreases due to fine precipitates. Although the small grain size deteriorates creep resistance, the effect of precipitates on enhancing creep resistance is relatively high so that overall creep resistance is improved by forming the precipitates.

With the recent increase in engine power, temperature of flue gas increases, and thus high temperature creep resistance applied to components of exhaust systems needs to be enhanced. Therefore, there is a need to develop a ferritic stainless steel with improved high temperature creep resistance capable of withstanding a stress in a high-temperature environment.

DISCLOSURE

Technical Problem

Provided are a ferritic stainless steel with improved high temperature creep resistance and a manufacturing method therefor.

Technical Solution

In accordance with an aspect of the present disclosure, a ferritic stainless steel with improved high temperature creep resistance includes, in percent by weight (wt %), 0.005 to 0.03% of carbon (C), 0.005 to 0.03% of nitrogen (N), 0.05 to 0.9% of silicon (Si), 0.05 to 0.9% of manganese (Mn), 14.0 to 19.0% of chromium (Cr), 0.1 to 0.6% of titanium (Ti), 0.1 to 0.6% of niobium (Nb), 0.1 to 0.6% of copper (Cu), 0.01 to 0.04% of phosphorus (P), 0.01% or less of sulfur (S, except for 0), and the balance of iron (Fe) and inevitable impurities, and satisfies Expressions (1) and (2) below:

$$0.5 \leq Nb/Cu \leq 3 \quad \text{Expression (1)}$$

$$20 \leq [2Nb+Ti]/[C+N] \quad \text{Expression (2)}$$

wherein Nb, Cu, Ti, C, and N denote contents (wt %) of the elements.

$7*10^5/mm^2$ or more of precipitates including Nb, Fe, and Cr may be distributed in a region of the ferritic stainless steel from T/3 to T/5 based on thickness T.

The precipitates may have sizes of 5 to 500 nm.

A creep deformation rate may be 50% or less under the conditions of 900° C. and 100 hours.

The ferritic stainless steel may further include 0.001 to 0.1% of aluminum (Al) and 0.001 to 0.6% of nickel (Ni).

In accordance with another aspect of the present disclosure, a method of manufacturing a ferritic stainless steel with improved high temperature creep resistance includes: preparing a cold-rolled steel sheet comprising, in percent by weight (wt %), 0.005 to 0.03% of carbon (C), 0.005 to 0.03% of nitrogen (N), 0.05 to 0.9% of silicon (Si), 0.05 to 0.9% of manganese (Mn), 14.0 to 19.0% of chromium (Cr), 0.1 to 0.6% of titanium (Ti), 0.1 to 0.6% of niobium (Nb), 0.1 to 0.6% of copper (Cu), 0.01 to 0.04% of phosphorus (P), 0.01% or less of sulfur (S, except for 0), and the balance of iron (Fe) and inevitable impurities, and satisfying Expressions (1) and (2) below; annealing the cold-rolled steel sheet; cooling the cold-rolled, annealed steel sheet by quenching to a temperature of 650 to 750° C.; and performing a cracking process for 5 minutes or more after the quenching:

$$0.5 \leq Nb/Cu \leq 3 \quad \text{Expression (1)}$$

$$20 \leq [2Nb+Ti]/[C+N] \quad \text{Expression (2)}$$

wherein Nb, Cu, Ti, C, and N denote contents (wt %) of the elements.

A cooling rate may be 10° C./sec or more in the cooling process.

The cracking process may be performed for 5 minutes to 20 minutes.

$7*10^5/mm^2$ or more of precipitates including Nb, Fe, and Cr may be distributed in fine structures after the cracking process.

The ferritic stainless steel may further include 0.001 to 0.1% of aluminum (Al) and 0.001 to 0.6% of nickel (Ni).

Advantageous Effects

According to embodiments of the present disclosure, a ferritic stainless steel with improved high temperature creep resistance and a method of manufacturing the same may be provided.

DESCRIPTION OF DRAWINGS

FIG. 1 shows a cross-sectional view for describing distribution of fine precipitates in a predetermined region in a thickness direction and a photograph of fine structures of the precipitates in the predetermined region.

FIG. 2 is a diagram for describing a method of measuring creepage introduced to exhibit high temperature creep resistance.

BEST MODE

A ferritic stainless steel with improved high temperature creep resistance according to an embodiment of the present disclosure includes, in percent by weight (wt %), 0.005 to 0.03% of carbon (C), 0.005 to 0.03% of nitrogen (N), 0.05 to 0.9% of silicon (Si), 0.05 to 0.9% of manganese (Mn), 14.0 to 19.0% of chromium (Cr), 0.1 to 0.6% of titanium (Ti), 0.1 to 0.6% of niobium (Nb), 0.1 to 0.6% of copper (Cu), 0.01 to 0.04% of phosphorus (P), 0.01% or less of sulfur (S, except for 0), and the balance of iron (Fe) and inevitable impurities, and satisfies Expressions (1) and (2) below:

$$0.5 \leq Nb/Cu \leq 3 \quad \text{Expression (1)}$$

$$20 \leq [2Nb+Ti]/[C+N] \quad \text{Expressin (2)}$$

wherein Nb, Cu, Ti, C, and N denote contents (wt %) of the elements.

Modes of the Invention

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. In the drawings, parts unrelated to the descriptions are omitted for clear description of the disclosure and sizes of elements may be exaggerated for clarity.

Throughout the specification, the term "include" an element does not preclude other elements but may further include another element, unless otherwise stated.

As used herein, the singular forms are intended to include the plural forms as well, unless the context clearly indicates otherwise.

Hereinafter, embodiments of the present disclosure will be described in detail with reference to the accompanying drawings.

The present inventors have made various studies to improve high temperature creep resistance of ferritic stainless steels and have found those described below.

In general, Nb is added to a ferritic stainless steel for an exhaust system to obtain high temperature strength. The high temperature strength may be improved by interfering movement of dislocation at room temperature and high temperature by solid solution strengthening effects of Nb.

However, creep deformation simultaneously occurs in a flue gas environment of up to 900° C. Creep deformation occurs by sliding of grain boundaries and diffusion of alloying elements. In order to suppress creep deformation, formation of fine precipitates is effective rather than obtaining solute Nb that inhibits the movement of dislocation.

In addition, based on the ideas of how to increase strength in a sandwich panel using panels having different strengths or in a tire by introducing a tire cord core into a tire rubber, it was found that creep behavior may be effectively controlled at high temperature by forming fine precipitates only in a predetermined region in a thickness direction of the ferritic stainless steel.

In general, initially solidified structures of a Nb-added ferritic stainless steel may be classified into equiaxed dendrite and columnar dendrite. Particularly, it was found that high temperature creep resistance may be improved in the case where fine precipitates including Nb are formed by densely enriching Nb in an interface between equiaxed dendrite and columnar dendrite (region from T/3 to T/5 based on thickness T), and distribution of precipitates with respect to thickness position was derived.

FIG. 1 shows a cross-sectional view for describing distribution of fine precipitates in a predetermined region in a thickness direction and a photograph of fine structures of the precipitates in the predetermined region.

Precipitates may be distributed in a particular thickness direction by adjusting alloying elements of the ferritic stainless steel and relationship among the alloying elements and by introducing a predetermined heat treatment pattern after cold annealing.

A ferritic stainless steel with improved high temperature creep resistance according to an embodiment of the present disclosure includes, in percent by weight (wt %), 0.005 to 0.03% of carbon (C), 0.005 to 0.03% of nitrogen (N), 0.05 to 0.9% of silicon (Si), 0.05 to 0.9% of manganese (Mn), 14.0 to 19.0% of chromium (Cr), 0.1 to 0.6% of titanium (Ti), 0.1 to 0.6% of niobium (Nb), 0.1 to 0.6% of copper (Cu), 0.01 to 0.04% of phosphorus (P), 0.01% or less of sulfur (S, except for 0), and the balance of iron (Fe) and inevitable impurities.

Hereinafter, reasons for numerical limitations on the contents of alloying elements in the embodiment of the present disclosure will be described. Hereinafter, the unit is wt % unless otherwise stated.

The content of C is from 0.005 to 0.03%.

Carbon (C), as an interstitial solid solution strengthening element, serves to improve strength of a ferritic stainless steel. Meanwhile, because costs of a steelmaking VOD process increase to control the C content at an extremely low level, a lower limit of the C content may be set to 0.005%. However, when the C content is excessive, C binding to Cr induces grain boundary precipitation of a Cr carbide such as $Cr_{23}C_6$ and locally causes depletion of Cr to deteriorate oxidation property at high temperature, and thus an upper limit of the C content may be set to 0.03%.

The content of N is from 0.005 to 0.03%.

Like carbon, nitrogen (N) is an interstitial solid solution strengthening element and serves to improve strength of a ferritic stainless steel. Meanwhile, because costs of a steelmaking VOD process increase to control the N content at an extremely low level, a lower limit of the N content may be set to 0.005%. However, when the N content is excessive, N binding to Cr induces formation of $Cr_2N$ precipitates and locally causes depletion of Cr to deteriorate oxidation property at high temperature. When the N content exceeds 0.015% in a ferritic stainless steel, a concentration of solute N is saturated, and thus an upper limit of the N content may be set to 0.03%.

The content of Si is from 0.05 to 0.9%.

Silicon (Si) is an element serving as a deoxidizer during a steelmaking process and stabilizing a ferrite phase. In the present disclosure, it is preferable to add Si in an amount of 0.05% or more to obtain strength and corrosion resistance of a ferritic stainless steel. However, when the Si content is excessive, a problem of deterioration in ductility and formability may occur, and thus an upper limit of the Si content is set to 0.9% in the present disclosure.

The content of Mn is from 0.05 to 0.9%.

Manganese (Mn) is an element stabilizing austenite and may be added in an amount of 0.05% or more in the present disclosure to obtain corrosion resistance. However, when the Mn content is excessive, reverse-transformation occurs during an annealing heat treatment process after hot rolling or cold rolling thereby deteriorating elongation, and thus an upper limit of the Mn content may be set to 0.9%.

The content of Cr is from 14.0 to 19.0%.

Chromium (Cr) is an element forming a passivated layer inhibiting oxidation and stabilizing ferrite. In the present disclosure, Cr may be added in an amount of 14.0% or more to obtain corrosion resistance and inhibit oxidation at high temperature. However, when the Cr content is excessive, problems of an increase in manufacturing costs and deterioration in formability may occur, and thus an upper limit of the Cr content may be set to 19.0%.

The content of Ti is from 0.1 to 0.6%.

Titanium (Ti) is an element effective on corrosion resistance of a steel because Ti preferentially binds to interstitial elements such as carbon (C) and nitrogen (N) to form precipitates (carbonitrides) to reduce amounts of solute C and solute N in the steel and inhibit formation of a Cr depletion region. In the present disclosure, Ti may be added in an amount of 0.1% or more. However, when the Ti content is excessive, Ti-based inclusions are formed causing a problem in a manufacturing process and a surface defect problem of discoloration to yellow is caused by reaction between Ti of a surface layer and oxygen, and thus an upper limit of the Ti content may be set to 0.6%.

The content of Nb is from 0.1 to 0.6%.

Niobium (Nb) is an element improving high temperature creep resistance by forming fine Nb precipitates. In the present disclosure, Nb may be added in an amount of 0.1% or more to obtain strength at high temperature by solute Nb. However, when the Nb content is excessive, coarse Nb precipitates formed thereby may cause brittle fracture and deteriorate high-temperature characteristics, and thus an upper limit of the Nb content may be set to 0.6%.

The content of Cu is from 0.1 to 0.6%.

Copper (Cu), like niobium (Nb), improves high temperature creep resistance by forming fine Cu precipitates, thereby contributing to strength at high temperature and may be added in an amount of 0.1% or more. However, an excess of Cu not only increases costs of raw materials but also deteriorates hot processibilty, and thus an upper limit of the Cu content may be set to 0.6%.

The content of P is from 0.01 to 0.04%.

Phosphorus (P), as an impurity that is inevitably contained in steels, is a major causative element of grain boundary corrosion during acid pickling or deterioration of hot processibilty, and therefore, it is preferable to control the P content as low as possible. In the present disclosure, the content of P is controlled in the range of 0.01 to 0.04%.

The content of S is 0.01% or less (excluding 0).

Sulfur (S), as an impurity that is inevitably contained in steels, is a major causative element of deterioration of hot possibility as being segregated in grain boundaries, and therefore, it is preferable to control the S content as low as possible. In the present disclosure, an upper limit of S is set to 0.01%.

In addition, the ferritic stainless steel with improved high temperature creep resistance according to the present disclosure may further include 0.001 to 0.1% of aluminum (Al) and 0.001 to 0.6% of nickel (Ni).

The content of Al is from 0.001 to 0.1%.

Aluminum (Al), as a strong deoxidizer, reduces a content of oxygen in molten steels and added in an amount of 0.001% or more in the present disclosure. However, when the Al content is excessive, Al of a surface layer reacts with oxygen to form a non-uniform oxide layer, thereby deteriorating oxidation resistance at high temperature. Thus, the Al content may be controlled to be 0.1% or less.

The content of Ni is from 0.001 to 0.6%.

Nickel (Ni), as an austenite-stabilizing element, is inevitably brought in from scrap iron during a steelmaking process and is controlled as an impurity in the present disclosure. Ni, like C and N, is an element stabilizing an austenite phase and improving corrosion resistance by slowing down a corrosion rate. However, in consideration of the possibility that Ni is incorporated in a small amount during a scrap-dissolving process, a lower limit of the Ni content may be set to 0.001%. An excess of Ni may cause reverse-transformation of austenite during an annealing heat treatment process after hot rolling or cold rolling to deteriorate elongation, and thus an upper limit of the Ni content may be set to 0.6%.

The remaining component of the composition of the present disclosure is iron (Fe). However, the composition may include unintended impurities inevitably incorporated from raw materials or surrounding environments. In the present disclosure, addition of other alloy components in addition to the above-described alloy components is not excluded. The impurities are not specifically mentioned in the present disclosure, as they are known to any person skilled in the art of manufacturing.

Meanwhile, the ferritic stainless steel with improved creep resistance according to an embodiment of the present disclosure may satisfy Expressions (1) and (2) below.

$$0.5 \leq Nb/Cu \leq 3.0 \qquad \text{Expression (1)}$$

As described above, it was confirmed that high temperature creep resistance may be improved in the case where fine precipitates including Nb are formed only in a predetermined region (region from T/3 to T/5 based on thickness T) in a thickness direction of the ferritic stainless steel.

By reducing solid solubility of Nb by adding Cu, enrichment of Nb in the interface between columnar dendrite and equiaxed dendrite may be maximized during an initial stage of a slab-casting process. Accordingly, fine precipitates including Nb may be formed during a final cold annealing process.

When a Nb/Cu value is less than 0.5, Cu precipitates are formed instead of Nb precipitates making it difficult to obtain high temperature creep resistance. When the Nb/Cu value is greater than 3.0, a problem of rapid coarsening of Nb precipitates may occur and a density of precipitates decreases making it difficult to obtain high temperature creep resistance by precipitates including Nb. Therefore, in the present disclosure, the Nb/Cu value is limited in the range of 0.5 to 3.0.

$$20 \leq (2Nb+Ti)/(C+N) \qquad \text{Expression (2)}$$

In general, Nb and Ti contained in a ferritic stainless steel bind to C and N to form Nb(C, N) and Ti(C, N) carbonitrides. When the contents of C and N are relatively large compared to that of Nb, coarse Nb(C, N) precipitates tend to be formed. Thus, fine $Nb_2(Fe,Cr)$ precipitates cannot be formed in the predetermined region (region from T/3 to T/5 based on thickness T) in a thickness direction of the ferritic stainless steel as described above.

Therefore, in the present disclosure, relationship among C, N, Nb, and Ti is derived to maximize formation of $Nb_2(Fe,Cr)$ precipitates without forming Nb(C, N) precipitates using Nb.

When the (2Nb+Ti)/(C+N) values are less than 20, it was confirmed that Nb(C, N) precipitates having a size of 500 nm or more are formed and formation of fine $Nb_2(Fe,Cr)$ precipitates is relatively inhibited.

In addition, the size of the $Nb_2(Fe,Cr)$ precipitates may be from 5 to 500 nm. When coarse precipitates including Nb is formed, the density of the precipitates decreases making it difficult to obtain high temperature creep resistance using precipitates including Nb. Therefore, in order to maximize high temperature creep resistance, the size of the precipitates may preferably be controlled to be 500 nm or less.

In the ferritic stainless steel according to the present disclosure satisfying the above composition range of the alloying elements and the relationship among the elements, the number of the precipitates including Nb, Fe, and Cr and distributed in the region from T/3 to T/5 based on thickness T may be $7*10^5/mm^2$ or more.

For example, the size of precipitates including Nb, Fe, and Cr may be from 5 to 500 nm.

In the ferritic stainless steel of the present disclosure including $7*10^5/mm^2$ or more of precipitates including Nb, Fe, and Cr having a size of 5 to 500 nm, a creep deformation of 5 mm or less is observed under the conditions of 800° C. and 100 hours, indicating that high temperature creep resistance is obtained. Accordingly, it is possible to minimize a strength decrease phenomenon at high temperature caused by creep deformation in the ferritic stainless steel.

Hereinafter, a method of manufacturing a ferritic stainless steel with improved high temperature creep resistance according to another embodiment of the present disclosure will be described.

A method of manufacturing a ferritic stainless steel with improved high temperature creep resistance according to an embodiment of the present disclosure may be performed by preparing a cold-rolled steel sheet via a common manufacturing process, and the method includes: preparing a cold-rolled steel sheet including a composition of the above-described alloying elements and satisfying Expressions (1) and (2); annealing the cold-rolled steel sheet; cooling the cold-rolled, annealed steel sheet by quenching at a temperature of 650 to 750° C.; and performing a cracking process for 5 minutes or more after the quenching.

For example, the cold-rolled steel sheet may be prepared by hot rolling a slab including the above-described alloying elements, annealing the hot-rolled steel sheet, and cold rolling the hot-rolled, annealed steel sheet.

The cold-rolled steel sheet is subjected to a common recrystallization heat treatment process in a cold annealing process.

For example, the cold-rolled steel sheet may be annealed in a temperature range, which is lower than an austenite-ferrite transformation temperature (Ac1) by 10° C. or more. Because an austenite phase is present in a small amount within the Cr content range of the present disclosure, the annealing temperature is limited to (Ac1-10)° C. or lower to prevent reverse-transformation. Within the above-described temperature range, the annealing process is performed to sufficiently form a solid solution of C and N.

The cold-rolled steel sheet is subjected to the cooling process by quenching to a temperature range of 650 to 750° C. after a common recrystallization heat treatment process during the cold annealing process.

In the present disclosure, a cooling finish temperature may be controlled below 750° C. to obtain fine precipitates including Nb. However, because a problem of residual stress may occur in the case of performing the heat treatment at a too low temperature, the temperature range of the cooling heat treatment pattern after cold annealing may be set to be 650° C. or higher.

In this case, a cooling rate may be 10° C./sec or higher. When the cooling rate is less than 10° C./sec, a time during which precipitates including Nb coarsen increases, and thus sizes of the precipitates including Nb increase and distribution density thereof decreases, making it difficult to obtain high temperature creep resistance.

The cracking process, which is maintained for 5 minutes of more after the quenching, is a process for uniformly distributing Nb precipitates in an appropriate size. When the cracking time is shorter than 5 minutes, it is advantageous for formation of fine Nb-containing precipitates, but the precipitates may be distributed in the form of clusters. When the cracking times is longer than 20 minutes, not only coarse Nb-containing precipitates are formed but also process efficiency may deteriorate due to an increase in heat treatment time and manufacturing costs may increase.

After cold annealing, quenching to a temperature range of 650 to 750° C. is required to inhibit formation of Cr carbonitrides, and high temperature creep resistance may be maximized by increasing the number of precipitates including Nb, Fe, and Cr by heat treatment maintained for 5 minutes or more in the above-described temperature range.

As described above, it may be possible to increase formation of fine precipitates including Nb in a composition including the same components by adjusting the alloying elements and introducing a heat treatment pattern after cold annealing, and high temperature strength may also be obtained.

In the cold-rolled, annealed steel sheet, the number of the precipitates including Nb, Fe, and Cr and distributed in the region from T/3 to T/5 may be $7*10^5/mm^2$ or more.

Hereinafter, the present disclosure will be described in more detail with reference to the following examples.

Slabs were prepared by ingot casting using various alloying elements shown in Table 1, hot-rolled to a thickness of 6 mm by re-heating at 1,200° C., and annealed at 1,100° C., cold-rolled to a thickness of 2.0 mm, and annealed at 1,100° C. to prepare a cold-rolled, annealed steel sheet.

Alloying elements (wt %) of the respective steel types and values obtained by Expressions (1) and (2) are shown in Table 1 below.

TABLE 1

| Steel type | Components (wt %) | | | | | | | | | | Expression (1) | Expression (2) |
|---|---|---|---|---|---|---|---|---|---|---|---|---|
| | C | N | Si | Mn | Cr | Ti | Nb | Cu | P | S | | |
| 1 | 0.0083 | 0.0065 | 0.41 | 0.21 | 17.5 | 0.23 | 0.21 | 0.26 | 0.024 | 0.003 | 0.81 | 43.9 |
| 2 | 0.007 | 0.008 | 0.23 | 0.35 | 15.6 | 0.19 | 0.35 | 0.24 | 0.023 | 0.002 | 1.46 | 59.3 |
| 3 | 0.015 | 0.008 | 0.51 | 0.18 | 18.5 | 0.19 | 0.15 | 0.29 | 0.032 | 0.003 | 0.52 | 21.3 |
| 4 | 0.011 | 0.019 | 0.33 | 0.43 | 16.3 | 0.13 | 0.47 | 0.16 | 0.028 | 0.002 | 2.94 | 35.7 |
| 5 | 0.0083 | 0.0065 | 0.41 | 0.21 | 17.5 | 0.23 | 0.21 | 0.26 | 0.024 | 0.003 | 0.81 | 43.9 |
| 6 | 0.007 | 0.008 | 0.23 | 0.35 | 15.6 | 0.19 | 0.35 | 0.24 | 0.023 | 0.002 | 1.46 | 59.3 |
| 7 | 0.015 | 0.008 | 0.51 | 0.18 | 18.5 | 0.19 | 0.15 | 0.29 | 0.032 | 0.003 | 0.52 | 21.3 |
| 8 | 0.011 | 0.019 | 0.33 | 0.43 | 16.3 | 0.13 | 0.47 | 0.16 | 0.028 | 0.002 | 2.94 | 35.7 |
| 9 | 0.015 | 0.021 | 0.11 | 0.38 | 14.8 | 0.33 | 0.35 | 0.06 | 0.021 | 0.004 | 5.83 | 28.6 |
| 10 | 0.021 | 0.024 | 0.37 | 0.29 | 17.1 | 0.14 | 0.31 | 0.23 | 0.025 | 0.003 | 1.35 | 16.9 |
| 11 | 0.009 | 0.013 | 0.22 | 0.18 | 16.3 | 0.24 | 0.15 | 0.37 | 0.031 | 0.003 | 0.41 | 24.5 |
| 12 | 0.007 | 0.008 | 0.56 | 0.34 | 18.2 | 0.17 | 0.24 | 0.07 | 0.032 | 0.002 | 3.43 | 43.3 |
| 13 | 0.029 | 0.028 | 0.63 | 0.39 | 15.3 | 0.41 | 0.11 | 0.35 | 0.028 | 0.003 | 0.31 | 11.1 |
| 14 | 0.019 | 0.008 | 0.43 | 0.12 | 17.5 | 0.12 | 0.12 | 0.15 | 0.023 | 0.002 | 0.80 | 13.3 |

In only some examples, the cold-rolled, annealed steel sheets were prepared by quenching to 700° C. at a rate of 15° C./sec after heat treatment, maintaining for about 10 minutes, and air cooling. In the other examples and comparative examples, air cooling was performed after annealing heat treatment.

The number of the precipitates was measured by recovering the precipitates using a replica extraction method and counting the number using a transmission electron microscope (TEM). The precipitates present per 1 mm² of each of the region from T/3 to T/5 based on thickness T and an average region of a base material were measured, and the measured results are shown in Table 2.

FIG. 2 is a diagram for describing a method of measuring creepage introduced to exhibit high temperature creep resistance.

High temperature creep resistance was expressed by using creepage (nm) measured after maintaining each of the cold-rolled, annealed steel sheets having a thickness of 2.0 mm at 800° C. for 100 hours. Referring to FIG. 2, creepage was expressed as a difference in degrees of sagging before and after each of the cold-rolled, annealed steel sheets having a thickness of 2.0 mm according to the examples and comparative examples was heat-treated at 800° C. for 100 hours on supports spaced apart from each other at an interval of 250 mm.

Specifically, referring to FIG. 2, an initial sag value was represented by [Hi(a)+Hi(b)−2*Hi(c)]/2, and a sag value after heat treatment was represented by [Hf(a)+Hf(b)−2*Hf(c)]/2, and a creepage was calculated as a difference between the initial sag value and the sag value after heat treatment. In this regard, Hi(a,b,c) and Hf(a,b,c) indicate length data before (initial)/after(final) heat treatment, respectively. Because the creepage indicates the degree of deformation by a certain load at 800° C., a lower creepage indicates better creep resistance.

In the present disclosure, creep deformation rates of the examples and comparative examples are shown in Table 2 by defining a creepage of 10 mm as a reference (creep deformation rate of 100%).

TABLE 2

| | Steel type | Quenching and cracking | Number of precipitates in 1/3T~1/5T (×10⁵/mm²) | Average number of precipitates in base material (×10⁵/mm²) | Creepage (mm) | Creep deformation rate (%) |
|---|---|---|---|---|---|---|
| Example 1 | 1 | ○ | 14.7 | 2.4 | 2.3 | 23 |
| Example 2 | 2 | ○ | 19.5 | 3.2 | 1.9 | 19 |
| Example 3 | 3 | ○ | 10.4 | 2.1 | 3.5 | 35 |
| Example 4 | 4 | ○ | 12.9 | 3.7 | 3 | 30 |
| Example 5 | 5 | X | 12.7 | 2.4 | 3.2 | 32 |
| Example 6 | 6 | X | 15.6 | 3.2 | 2.7 | 27 |
| Example 7 | 7 | X | 7.5 | 2.1 | 4.4 | 44 |
| Example 8 | 8 | X | 9.6 | 3.7 | 3.9 | 39 |
| Comparative Example 1 | 9 | X | 3.4 | 2.9 | 10.5 | 105 |
| Comparative Example 2 | 10 | X | 3.6 | 3.1 | 11.5 | 115 |
| Comparative Example 3 | 11 | X | 4.8 | 3.3 | 8.9 | 89 |
| Comparative Example 4 | 12 | X | 4.3 | 3.2 | 9.6 | 96 |
| Comparative Example 5 | 13 | X | 2.1 | 2 | 15.6 | 156 |
| Comparative Example 6 | 14 | X | 2.7 | 2.2 | 13.2 | 132 |

Referring to Table 2, in the case of Examples 1 to 8 that satisfy the alloy composition, values of Expression (1), and the range of values of Expression (2) suggested by the present disclosure, the number of precipitates including Nb, Fe, and Cr in the region from T/3 to T/5 based on thickness T of the ferritic stainless steel was $7*10^5/mm^2$ or more and the creep deformation was 5 mm or less under the conditions of 900° C. and 100 hours indicating a creep deformation rate of 50% or less, and thus creep resistance improved by about 40 to 80% was confirmed compared to the comparative examples.

In the case of Comparative Examples 1 and 4 using Steel Types 9 and 12 where the Cr content was less than 0.1% and the values of Expression (1) were out of the above-described range, the numbers of the precipitates including Nb, Fe, and Cr distributed in the T/3 to T/5 region were $3.4*10^5/mm^2$ and $4.3*10^5/mm^2$, respectively. It is considered that this is because the amount of Cu is insufficient to form the precipitates including Nb, Fe, and Cr.

In Comparative Examples 2 and 6 using Steel Types 10 and 14 where the (2Nb+Ti)/(C+N) values according to Expression (2) were less than 20, the numbers of the precipitates including Nb, Fe, and Cr distributed in the T/3 to T/5 region were less than $7*10^5/mm^2$. It is considered this is because Ti and Nb contained in relatively high contents react with C and N to form Nb(C, N) precipitates, thereby decreasing solute C and N and inhibiting formation of fine $Nb_2(Fe,Cr)$ precipitates, although Expression (1) was satisfied in Comparative Examples 2 and 6.

In Comparative Examples 3 and 5 using Steel Types 11 and 13 where the values of Expression (1) were less than 0.5 due to the high Cu content relative to the Nb content although the composition range of components of the present disclosure including Ti, Nb, and Cu was satisfied and Expression (2) was satisfied, $Nb_2(Fe,Cr)$ precipitates were formed but coarsened. Coarse precipitates may cause a problem that a density suggested by the present disclosure cannot be obtained. Although Comparative Example 5 satisfies the composition range of components of the present disclosure, the average density of $Nb_2(Fe,Cr)$ precipitates in the base material was low as well as in the region from T/3 to T/5, and thus it was confirmed that the most inferior high temperature creep resistance was obtained therein.

Meanwhile, referring to Table 2, a large amount of precipitates including Nb, Fe, and Cr were obtained in the region from T/3 to T/5 according to Examples 1 to 4 where a predetermined heat treatment pattern was introduced after cold annealing when compared to Examples 5 to 8. Particularly, the precipitates including Nb, Fe, and Cr were distributed with a density of $19.5*10^5/mm^2$ in the region from T/3 to T/5 in Example 2, and accordingly, a creep deformation of 1.9 mm was obtained under the conditions of 900° C. and 100 hours.

According to the above-described embodiment, a ferritic stainless steel having improved high temperature creep resistance may be prepared by forming fine precipitates including Nb, Fe, and Cr in a predetermined region (region from T/3 to T/5 based on thickness T) by adjusting the alloying elements and relationship among the alloying elements.

While the present disclosure has been particularly described with reference to exemplary embodiments, it should be understood by those of skilled in the art that various changes in form and details may be made without departing from the spirit and scope of the present disclosure.

INDUSTRIAL APPLICABILITY

According to the present disclosure, the ferritic stainless steel may be used in a high temperature environment due to improved high temperature creep resistance of the ferritic stainless steel.

The invention claimed is:

1. A ferritic stainless steel with improved high temperature creep resistance comprising, in percent by weight (wt %), 0.005 to 0.03% of carbon (C), 0.005 to 0.03% of nitrogen (N), 0.05 to 0.9% of silicon (Si), 0.05 to 0.9% of manganese (Mn), 14.0 to 19.0% of chromium (Cr), 0.1 to 0.6% of titanium (Ti), 0.1 to 0.6% of niobium (Nb), 0.1 to 0.6% of copper (Cu), 0.01 to 0.04% of phosphorus (P), 0.01% or less of sulfur (S, except for 0), and the balance of iron (Fe) and inevitable impurities, and
satisfying Expressions (1) and (2) below,
wherein $7*10^5/mm^2$ or more of precipitates including Nb, Fe, and Cr are distributed in a region of the ferritic stainless steel from T/3 to T/5 based on thickness T:

$$0.5 \leq Nb/Cu \leq 3 \quad \text{Expression (1):}$$

$$20 \leq [2Nb+Ti]/[C+N] \quad \text{Expression (2):}$$

wherein Nb, Cu, Ti, C, and N denote contents (wt %) of the elements.

2. The ferritic stainless steel according to claim 1, wherein the precipitates have sizes of 5 to 500 nm.

3. The ferritic stainless steel according to claim 1, wherein a creep deformation rate is 50% or less under the conditions of 900° C. and 100 hours.

4. The ferritic stainless steel according to claim 1, further comprising 0.001 to 0.1% of aluminum (Al) and 0.001 to 0.6% of nickel (Ni).

5. A method of manufacturing a ferritic stainless steel with improved high temperature creep resistance, the method comprising:
preparing a cold-rolled steel sheet comprising, in percent by weight (wt %), 0.005 to 0.03% of carbon (C), 0.005 to 0.03% of nitrogen (N), 0.05 to 0.9% of silicon (Si), 0.05 to 0.9% of manganese (Mn), 14.0 to 19.0% of chromium (Cr), 0.1 to 0.6% of titanium (Ti), 0.1 to 0.6% of niobium (Nb), 0.1 to 0.6% of copper (Cu), 0.01 to 0.04% of phosphorus (P), 0.01% or less of sulfur (S, except for 0), and the balance of iron (Fe) and inevitable impurities, and satisfying Expressions (1) and (2) below;
annealing the cold-rolled steel sheet;
cooling the cold-rolled, annealed steel sheet by quenching to a temperature of 650 to 750° C.; and
performing a cracking process for 5 minutes or more after the quenching:

$$0.5 \leq Nb/Cu \leq 3 \quad \text{Expression (1):}$$

$$20 \leq [2Nb+Ti]/[C+N] \quad \text{Expression (2):}$$

wherein Nb, Cu, Ti, C, and N denote contents (wt %) of the elements.

6. The method according to claim 5, wherein a cooling rate is 10° C./sec or more in the cooling process.

7. The method according to claim 5, wherein the cracking process is performed for 5 minutes to 20 minutes.

8. The method according to claim 5, wherein $7*10^5/mm^2$ or more of precipitates including Nb, Fe, and Cr are distributed in fine structures after the cracking process.

9. The method according to claim 5, wherein the ferritic stainless steel further comprises 0.001 to 0.1% of aluminum (Al) and 0.001 to 0.6% of nickel (Ni).

* * * * *